United States Patent [19]

Wright

[11] Patent Number: 4,583,715
[45] Date of Patent: Apr. 22, 1986

[54] SAFETY GATE

[76] Inventor: John Wright, #93-1081 Borden Side Rd., Ottawa, Ontario, Canada, K2C 3P4

[21] Appl. No.: 671,420

[22] Filed: Nov. 14, 1984

[30] Foreign Application Priority Data

Sep. 14, 1984 [CA] Canada .................................. 463234

[51] Int. Cl.<sup>4</sup> .......................................... E04H 17/16
[52] U.S. Cl. ......................................... 256/24; 24/26; 160/225; 160/226; 49/55
[58] Field of Search ................. 49/55; 256/24, 25, 26, 256/23; 160/128, 160, 225, 226, 227, 374; 16/361, 86.1, 86.2, 348

[56] References Cited

U.S. PATENT DOCUMENTS

| 334,676 | 1/1886 | Paulus et al. | 160/225 |
| 2,563,446 | 8/1951 | Abel | 256/25 X |
| 2,577,034 | 12/1951 | Quinlan | 160/225 |
| 3,431,966 | 3/1969 | Injeski | 160/225 |

FOREIGN PATENT DOCUMENTS

| 577220 | 5/1955 | Canada . | |
| 2357660 | 5/1975 | Fed. Rep. of Germany | 49/55 |
| 618725 | 2/1949 | United Kingdom | 16/86.1 |
| 2058186 | 4/1981 | United Kingdom | 49/55 |

Primary Examiner—Cornelius J. Husar
Assistant Examiner—Joseph A. Fischetti
Attorney, Agent, or Firm—Sixbey, Friedman & Leedom

[57] ABSTRACT

A safety barrier of the type for a hall or doorway to prevent passage of children, animals or the like. The barrier is expandable to completely block the passageway, and is provided with a pivoting gate in a portion thereof which may be opened as required to permit passage through the barrier.

16 Claims, 2 Drawing Figures

U.S. Patent  Apr. 22, 1986  4,583,715
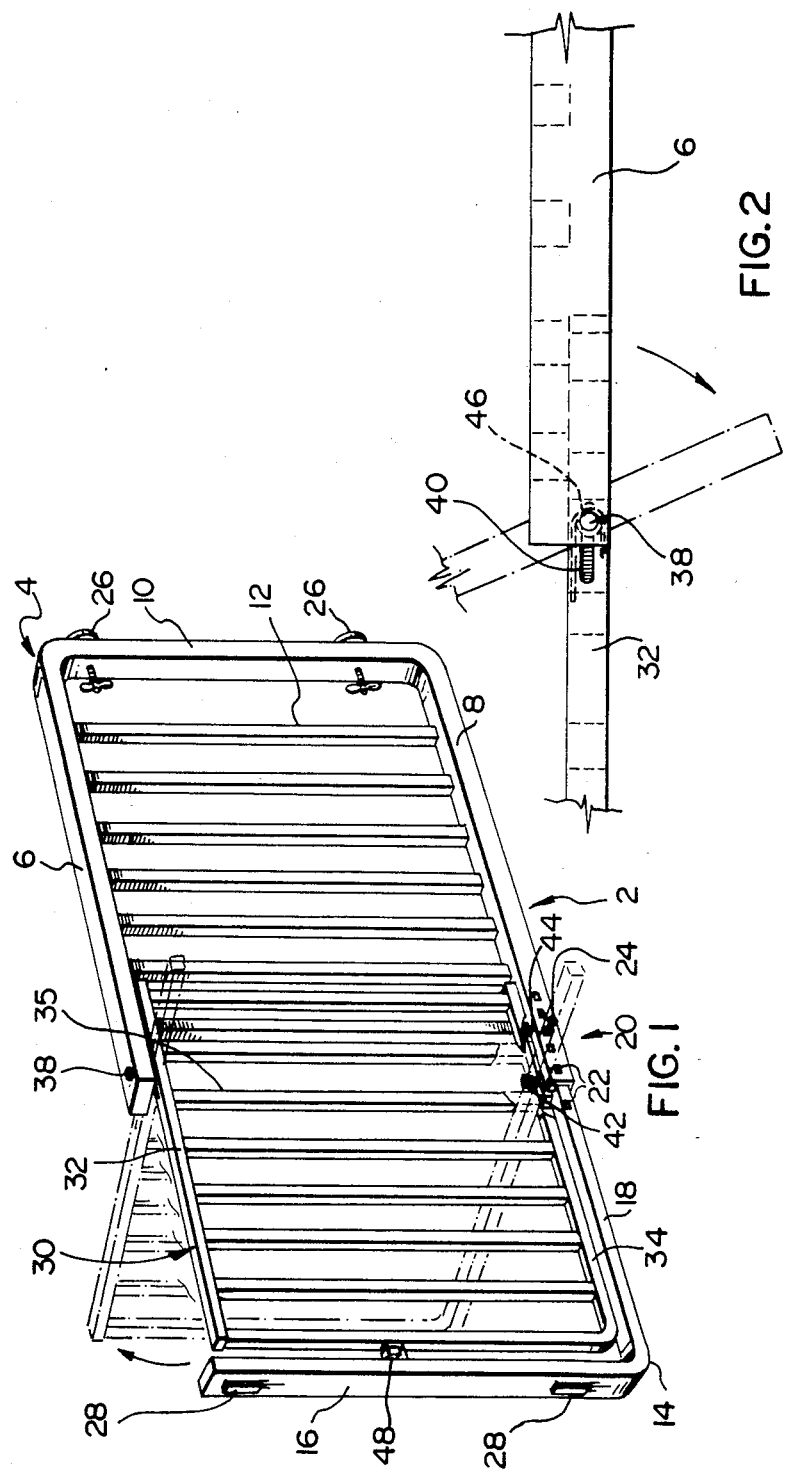

SAFETY GATE

The present invention relates to a safety barrier for children or animals, and more particularly to a removable barrier for a passageway such as a hallway, door frame or the like.

BACKGROUND OF THE INVENTION

The utility of lightweight, removable safety barriers for restricting the movement of small children or animals is well-known. Such barriers are often temporarily installed at the top or bottoms of stairways or in hallways, for the safety, and/or to restrict the movement, of infants or animals.

Particularly designed for the safety of infants, a common form of barrier has been an expansion gate which comprises an expandable network of criss-crossing rungs, the expansion gate being capable of opening or closing in accordion-like fashion. The gate is usually screwed into a side frame or wall at one side and may be fastenable to a clip or locking means, when expanded across the passageway, on the other side. Such a gate has proven difficult to open or close with a child in one's arms. In many instances, such as in rental situations, it is not permitted to place screw holes in walls or door frames. Moreover such an expansion gate is capable of pinching fingers and hands upon retraction and, under pressure, can bow out at the bottom allowing a child to slip under it.

A more solid and stable type of safety barrier for a passageway, particularly adapted for small children, is a pressure lock gate which comprises a pair of joined, mutually axially slidable frames, which can be expanded into open position blocking a passageway, with the edges of the gate bearing against the walls of the passageway. When in expanded position, a pair of centrally positioned rods one joined to each sliding frame member, clip into engagement with each other to maintain the gate in that expanded position with its sides bearing against the vertical side walls. Such a safety barrier does not permit ready opening or closing by a person carrying a child: the barrier must somehow be climbed over instead. Of course, this creates obvious difficulties if the the barrier is approached up a stairway or at the top of a stairway when a person is on the way down.

Because the gate frame is square, if the side walls are not completely vertical, the edges of the barrier bear unevenly against the side wall resulting in an insecure positioning of the barrier in the passageway. Even when securely positioned, the barrier of this construction tends to pop out of position, for example when rammed by a child in a walker.

Canadian Pat. No. 577,220 of Vickers-Willis issued June 9, 1959 describes an infant gate for an doorway, which gate has a frame with two complementary co-extensive sections connected for relative axial slidable movement. As in the case of the pressure lock gate, when the co-extensive sections are expanded to open position to block the doorway, their sides bear against the frame of the doorway thereby restricting dislodgement of the barrier from that position. Bolts with wing nuts extend between the two sections and are used to secure the sections in position. Again, however, as with the pressure lock gate, this gate is intended solely as a barrier and no provision is made for its temporary opening to permit passage of a person. Stepping over such a gate is difficult, for example while carrying a child. Also, as with a pressure lock gate, if the side frames of the doorway are not vertical, the sides of the gate fit unevenly resulting in an insecure placement of the gate.

It is an object of the present invention to provide a safety barrier for a hallway or doorway, to restrict the movement of infants or animals, which barrier will permit ready passage of an adult while it remains in position. It is a further object of the present invention to provide such a safety barrier which can be used in a rental situation, not requiring screw holes or the like in a side wall for its support.

SUMMARY OF THE INVENTION

According to the present invention there is provided a safety barrier for a passageway having spaced vertical side walls or frames. The barrier comprises a barrier element having spaced, parallel upper and lower frame elements which are joined at corresponding ends to a vertical side frame element. A plurality of spaced barrier rungs extend between the upper and lower frame elements. The barrier further comprises a frame assembly which has a vertical side frame element and a lower frame element, both joined at their ends to provide an "L"-shaped configuration. The free end of this lower frame element is secured to the free end of the lower frame element of the barrier element for relative axial slidable movement. Locking means associated with the lower frame elements releasably lock them in selective relative positions. The barrier also comprises a gate element which is mounted on the upper frame element of the barrier element and the lower frame element of the frame assembly. The gate element is so mounted to provide sliding, axial movement in conjunction with the frame assembly, relative to the barrier element, and pivotal movement between closed position with the plane of the gate element parallel to that of the barrier element, and opened position to permit passage of a person through the barrier. It pivots about a vertical axis extending between the upper frame element of the barrier element and the lower frame element of the frame assembly. The gate element is of a size and position, when in closed position, to obstruct passage between the barrier element and the side frame element of the frame assembly. When in open position the gate element permits such passage. Lock means associated with the gate element releasably lock the gate in closed position. Means are associated with the safety barrier and adjustable to bear against the side walls or frames, to secure the barrier in position across a passageway when the frame assembly and barrier element are locked in a predetermined position.

In a preferred embodiment of the present invention, the means associated with the safety barrier to adjustably bear against the side walls comprise foot pads which are manually adjustable to bear against the side walls or frames and secure the safety barrier in that position.

BRIEF DESCRIPTION OF THE DRAWINGS

These and other objects and advantages of the invention will become apparent upon reading the following detailed description and upon referring to the drawings in which:

FIG. 1 is a perspective view of an example embodiment of a safety barrier according to the present invention; and FIG. 2 is a detail plane view from the top of the safety barrier of FIG. 1.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Turning to FIG. 1 there is shown a safety barrier 2, on the right side of which is a barrier element 4 having spaced parallel upper frame element 6 and lower frame element 8. Corresponding ends of the these frame elements are joined to a vertical side frame element 10 as illustrated. Spaced, parallel, vertically oriented rungs 12 extend between upper frame elements 6 and lower frame element 8 along most of their length. On the left side of barrier 2 is frame assembly 14 made up of vertical side frame element 16 and horizontal lower frame element 18, these elements being joined at one end to provide assembly 14 with an "L"-shaped configuration. Lower frame element 8 of barrier element 4 is of tubular construction such that it receives the free end of lower frame element 18 to permit relative axial slidable movement thereof. This features enables expansion of the sides of barrier 2 (formed by side elements 10 and 16) to the walls or frames of a passageway such as a door frame or hallway. Any appropriate locking means 20 may be provided to releasably secure the lower frame elements 8 and 18 in appropriate expanded position. In the illustrated embodiment, this locking mechanism comprises a plurality of spaced holes 22 in lower frame elements 8 and 18, which holes are each individually alignable with a plurality of holes in the other element. A pin 24 is releasably insertable in aligned holes to block the lower frame elements 8 and 18 in appropriate expanded position. The pin of course would be of a construction which would be difficult for an infant to release. To secure the barrier 2, thus expanded, in position in a passageway, adjustable foot pads 26 are provided on at least one of the side frame elements 10 or 16. In the illustrated embodiment, these foot pads are shown on vertical side element 10, and, on the side frame element 16 are a plurality of friction pads 28. By turning the handles of adjustable foot pads 26 to extend the foot pads outwardly from side frame element 10, until the foot pads 26 and friction pads 28 are firmly bearing against the side walls or frames of the passageway, a secure positioning of the safety barrier 2 in that passageway is achieved. If the side wall or frame corresponding to side element 10 is not vertical, the use of foot pads 26 permits individual positioning of foot pads to account for any such discrepancies in vertical positioning of the wall or frame. Where the frame or wall of the passageway is not vertical on the other side as well, of course friction pads 28 may be replaced with foot pads 26 on side frame element 16.

A gate element 30 is provided extending between barrier element 4 and side frame element 16 of frame assembly 14. This gate element 30 comprises an upper frame element 32, a lower frame element 34 and vertically oriented rungs 36 which are spaced along the length of frame elements 32 and 34. Gate element 30 rotates on an axis of rotation which passes through upper and lower frame elements 6 and 8 respectively of barrier element 4, and upper and lower frame elements 32 and 34 of gate element 30, the axis of rotation being positioned however, as illustrated in FIG. 2, beyond the last of barrier element rungs 12, and laterally, to one side of them, to enable unobstructed pivoting of gate element 30 in one direction as illustrated. Rungs 12 of barrier element 4 adjacent the proximal end of gate element 30 act as stops to prevent the pivoting of the gate element in the other direction.

Pivoting of gate element 30 is achieved by means of upper pivot pin 38 which is immovably secured to upper frame element 6, and lower pivot pin 42 which is immovably secured to lower frame element 18 of frame assembly 14. The corresponding frame elements 32 and 34 of gate element 30 are rotatably secured to these pivot pins. As illustrated in FIG. 2, an appropriate slot 40 is provided in the upper frame element 32 of gate element 30 and a corresponding slot 44 is provided in lower frame element 8 of barrier element 4, these slots permitting relative axial movement of frame assembly 14 and gate element 30 without obstruction to such lateral movement being given to pivot pins 38 or 42.

Thus, when gate element 30 and frame assembly 14 are slid to the right, with respect to barrier element 4, upper pivot pin 38 which is immovably secured to upper frame element 6 slides in groove 40 of upper frame element 32 of gate element 30 while lower pivot pin 42, secured to lower frame element of frame assembly 14 slides in slot 46 in lower frame element 8 of barrier element 4. It should be noted that even when safety barrier 2 has been opened to its fullest extent, with gate element 30 moved so far as it can be to the left (FIG. 1), rungs 36 of gate element 30 and rungs 12 of barrier assembly 4 provide a complete obstruction across the barrier.

As can be seen in FIG. 2, it is preferred that an appropriate biasing means such as a spring 46 be associated with the pivoting mechanism of the gate element to ensure the closing of the gate from open position (phantom in FIGS. 1 and 2) to closed position. In that closed position, an appropriate lock and latch mechanism 48, which would be difficult for an infant but easy for an adult to operate, is provided to normally, but releasably, lock gate element 30 in closed position as illustrated in FIG. 1. Of course, it will be readily understood that by appropriate manipulation of lock/latch mechanism 48, gate element 30 is freed to pivot to the open (phantom) position, against the urging of the bias in spring 46, to enable passage of a person through the opening thereby provided. When that person has passed and is no longer holding the gate open, spring 46 then causes the gate element 30 to close to the position illustrated in full line, where lock/latch mechanism 48 again releasably secures the gate in that position.

Thus it is apparent that there has been provided in accordance with the invention a safety barrier for a hall or doorway that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A safety barrier for a passageway with spaced vertical side walls or frames, the barrier comprising:

(a) a barrier element having spaced, parallel upper and lower frame elements joined at corresponding ends to a vertical side frame element, (b) a plurality of spaced barrier rungs extending between the upper and lower frame elements, (c) a frame assembly having a vertical side frame element and a lower frame element joined at their ends to provide an "L"-shaped configuration, the free end of this lower frame element secured to the free end of the lower frame element of the barrier element for relative axial slidable movement, (d) locking means associated with the lower frame elements for releasably locking them in selective relative positions, (e) a gate element mounted on the upper frame element of the barrier element and the lower frame element of the frame assembly for sliding axial movement in conjunction with the frame assembly relative to the barrier element and for pivotal movement between closed position with the plane of the gate element parallel to that of the barrier element, and opened position to permit passage of a person through the barrier, about a vertical axis extending between the upper frame element of the barrier element and the lower frame element of the frame assembly, the gate element being of a size and position when in closed position to obstruct passage between the barrier element and the side frame element of the frame assembly, and when in open position to permit such passage, (f) lock means associated with the gate element to releasably lock the gate in closed position, and (g) means associated with the safety barrier and adjustable to bear against the side walls or frames to secure the barrier in position across a passageway when the frame assembly and barrier element are locked in a predetermined position.

2. A safety barrier according to claim 1 wherein the means associated with the safety barrier and adjustable to bear against the side walls or frames are a plurality of adjustable foot pads.

3. A safety barrier according to claim 2 wherein the adjustable foot pads are mounted on the vertical side element of the barrier element, facing outwardly to the side and are movable in a direction parallel to the upper and lower frame elements, and a plurality of friction pads are mounted on the outer side of the vertical side frame element of the frame assembly to bear against a corresponding side wall or frame when the adjustment pads are moved into position bearing against the opposite side wall or frame.

4. A safety barrier according to claim 1 wherein the free end of the lower frame element of the barrier element is tubular and receives in its open end for sliding movement the free end of the lower frame element of the frame assembly.

5. A safety barrier according to claim 4 wherein corresponding sides of the lower frame elements are provided with a plurality of apertures, each aperture of one of these elements being alignable with apertures of the other such element, a locking pin being insertable into a pair of aligned apertures to releasably lock the lower frame elements in that relative position.

6. A safety barrier according to claim 1 wherein the rectangular gate element pivots on upper and lower pivot pins, the gate and the barrier element being slotted as required to permit unobstructed sliding movement of these pivot pins during sliding axial movement of the rectangular gate element and the frame assembly relative to the barrier element.

7. A safety barrier according to claim 1 wherein the gate element is provided with upper and lower horizontal frame elements, a plurality of parallel spaced barrier rungs, vertically oriented when the barrier is in position, extending between these upper and lower frame elements.

8. A safety barrier according to claim 7 wherein the rectangular gate element pivots on upper and lower pivot pins, the gate and the barrier element being slotted as required to permit unobstructed sliding movement of these pivot pins during sliding axial movement of the rectangular gate element and the frame assembly relative to the barrier element.

9. A safety barrier according to claim 8 wherein the upper frame element of the gate element is slotted to permit axial movement of the upper pivot pin.

10. A safety barrier according to claim 9 wherein the free end of the lower frame element of the barrier element is tubular and receives in its open end for sliding movement the free end of the lower frame element of the frame assembly.

11. A safety barrier according to claim 10 wherein the lower pivot pin of the gate element is fixed to the lower frame element of the frame assembly, and the lower frame element of the barrier gate is slotted to permit unobstructed axial sliding movement of the lower pivot pin.

12. A safety barrier according to claim 1 or 7 wherein a biasing means is associated with the gate element to urge the gate to closed position when the gate element is in open, unobstructed position.

13. A safety barrier according to claim 1 wherein the lock means associated with the gate element co-operates with means on the vertical frame element of the frame assembly to releasably lock the gate in closed position.

14. A safety barrier according to claim 1 wherein the rungs of the barrier element are parallel and when in position vertically oriented.

15. A safety barrier according to claim 14 wherein the gate element is provided with upper and lower frame elements, a plurality of parallel spaced barrier rungs, vertically oriented when the barrier is in position, extending between these upper and lower frame elements.

16. A safety barrier according to claim 15 wherein the rungs of the barrier element are all spaced to one side of the axis of rotation of the gate element for all positions of that gate element with respect to the barrier element.

* * * * *